UNITED STATES PATENT OFFICE.

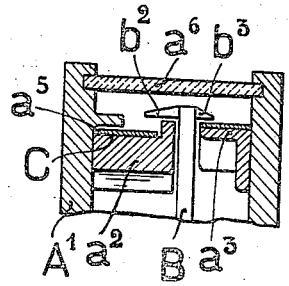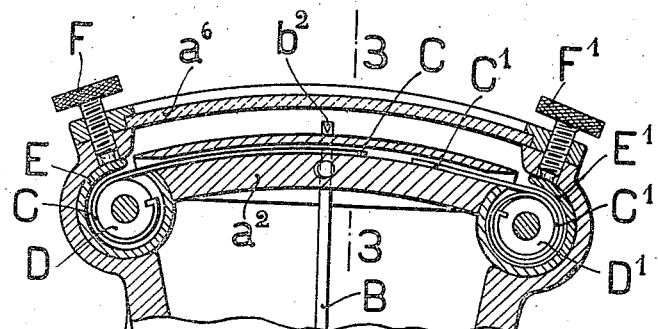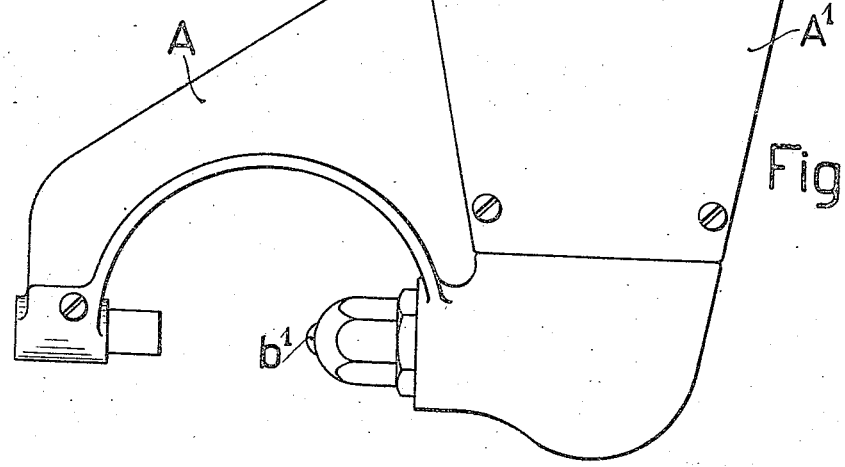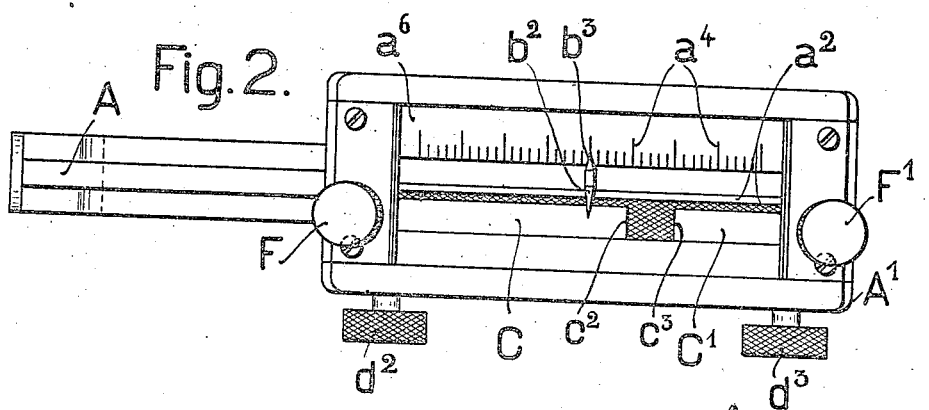

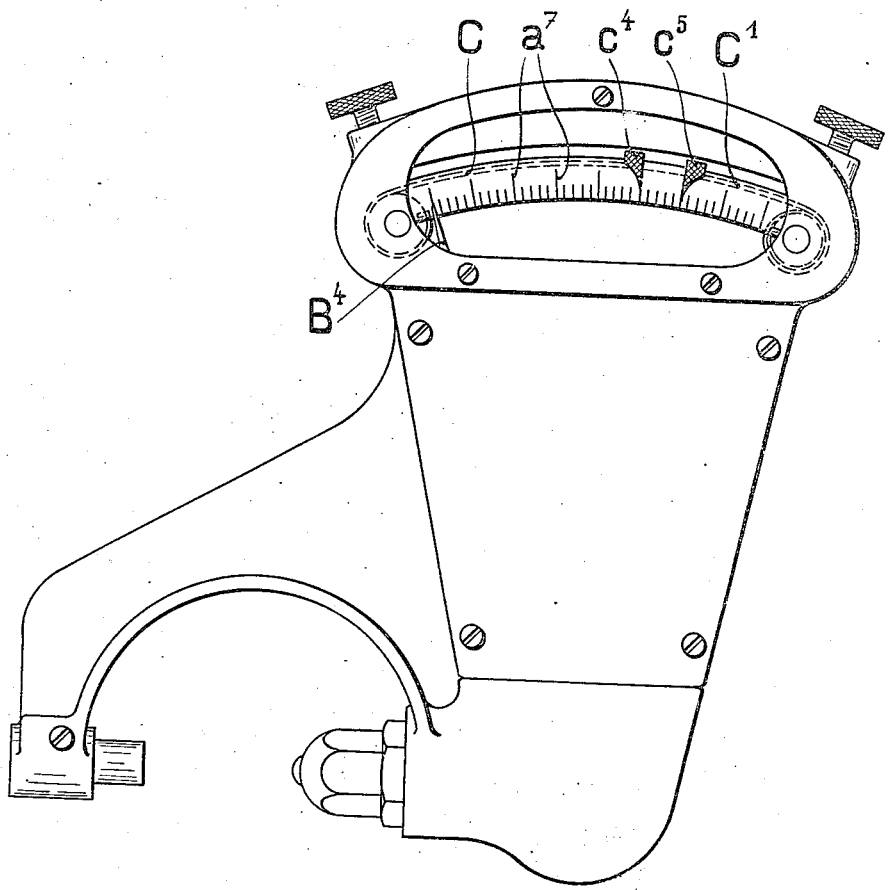

MAX BARTHOLDY, OF ESSEN, GERMANY, ASSIGNOR TO FRIED. KRUPP AKTIEN-GESELLSCHAFT, OF ESSEN-ON-THE-RUHR, GERMANY.

INDICATING-LEVER-LIMIT GAUGE.

1,422,169.   Specification of Letters Patent.   Patented July 11, 1922.

Application filed May 20, 1921. Serial No. 471,182.

*To all whom it may concern:*

Be it known that I, MAX BARTHOLDY, residing at Essen, Germany, a citizen of the German Republic, have invented a certain new and useful Improvement in Indicating-Lever-Limit Gauges, of which the following is a specification.

This invention relates to indicating lever limit gauges of the type in which the indicating device is provided with a tolerance field adjustable for different degrees of accuracy. Indicating lever limit gauges with an adjustable tolerance field are known, per se but in these known gauges the tolerance field does not form part of the indicating device. On the contrary, a special indicating device provided with two signal lamps is required in which one or the other of the lamps is illuminated through the closing of a signal circuit by the contact, of the indicating needle connected to the touching member of the gauge, with one or the other of two adjustable contact screws. But in many cases such an arrangement is not sufficiently simple and is particularly inconvenient in that it cannot be used alone but only in combination with a source of current of suitable voltage.

Limit gauges are also known which have no indicating lever and the tolerance field of which is limited by adjustable slides. But this arrangement is unsuitable for indicating lever limit gauges since it requires either a dust-tight cover for the circular slot that serves to guide the slides (when the slides are to be adjusted by hand) or a rack and pinion must be provided for each slide in order to adjust them. In the first case the handling would be difficult and uncertain as any alteration of the tolerance field would necessitate the removal and replacement of said cover, and moreover, the freehand adjustment of the slide would be difficult to carry out with the required degree of accuracy: in the second case the construction would be cumbrous. Both these disadvantages are obviated in the indicating lever limit gauge which forms the subject-matter of the present invention and which, though of the most simple construction and great reliability, enables the tolerance field to be conveniently and very accurately adjusted.

The invention will be described with reference to the accompanying drawings which show two embodiments of the subject-matter of the invention in the form of jaw gauges, by way of example.

Fig. 1 is a front elevation of the first construction, partly in section:

Fig. 2 is the corresponding plan:

Fig. 3 is a section corresponding to the line 3—3 of Fig. 1, seen from the right: and Fig. 4 is a front elevation of the second construction.

The construction shown in Figs. 1 to 3 will be described first.

Attached to the body A of the jaw gauge, is a casing $A^1$ in which the oscillating indicator B is mounted to reproduce to an enlarged scale the displacement of the movable measuring spindle $b^1$. The indicator B passes through between two rails $a^2$ and $a^3$ which are screwed to the front and back wall respectively, of the casing $A^1$ and its free end is provided with two points $b^2$ and $b^3$ which are bent at right angles and adapted to move over the cylindrically curved surfaces of the rails $a^2$ and $a^3$. A scale $a^4$ is provided on the outer surface of the rail $a^3$, whilst the outer surface of the rail $a^2$ is uniformly, coloured, for example, red. Two very thin steel bands C and $C^1$ are adapted to slide on the outer surface of the rail $a^2$ one of the longitudinal edges of the bands being guided in a groove $a^5$ formed by the rail $a^2$ and the wall of the casing $A^1$. The portions of the steel bands C and $C^1$, projecting beyond the ends of the rail $a^2$, are wound on drums D and $D^1$, each of which is adapted to be rotated in the casing $A^1$ by means of a small knurled wheel $d^2$ and $d^3$. The portion of the steel bands C and $C^1$ that is wound on the drum D and $D^1$ is surrounded by a spring clamping sleeve E and $E^1$ which can be pressed on the wound portion of the steel bands C and $C^1$ by means of clamping screws F and $F^1$. The steel bands C and $C^1$ are so arranged that their adjacent edges $c^2$ and $c^3$ represent the limits of the tolerance field which is formed by the portion of the coloured outer surface of the rail $a^2$ that is visible between them. The casing $A^1$ is covered at the top by an arched glass plate $a^6$.

In using the hereinbefore described limit gauge the clamping screws F, $F^1$ are first released and the clock spring strips C and $C^1$ are then adjusted by turning the knurled wheels $d^2$ and $d^3$ in such a way that the tolerance field limited by the two edges $c^2$ and $c^3$ of the strips corresponds in position and size with the nature and size of the prescribed fit. If in measuring an article the point $b^2$ of the indicator B remains within the tolerance field determined in this way, the said article will be of the required accuracy.

The second construction shown in Fig. 4 differs from that hereinbefore described only in having the scale $a^7$ on the flat outer surface of the rail $a^3$ instead of having it, as the scale $a^4$ of the first example, on the cylindrical surface and in having the tolerance field limited by marks $c^4$ and $c^5$ which are mounted at the ends of the curved steel strips C and $C^1$ in such a way that their points extend to the divisions on the scale $a^7$. In this case the indicator $B^4$ has a straight point, corresponding to the nature of the scale. In view of the description of the first construction no further explanation of the action is required.

Claims.

1. In a gauge of the class described provided with a scale and a pointer cooperating therewith, a pair of steel strips adjustable relative to the scale, the ends of said strips defining a tolerance field and means for adjusting said strips and means for securing them in their adjusted position.

2. In an indicating lever limit gauge provided with a scale and pointer cooperating therewith, a pair of spring strips disposed adjacent and adjustable relatively to the scale, the adjacent ends of said strips defining a tolerance field, drums upon which said strips are adapted to be wound and means for locking said drums to retain said strips in their adjusted position.

3. In a gauge of the class described provided with a cylindrical surface, a scale arranged on said cylindrical surface, two spring strips disposed upon and displaceable along said cylindrical surface, drums upon which said strips are adapted to be wound and means for locking said drums to secure said strips in their adjusted positions, the adjacent edges of said strips defining the limits of a tolerance field.

The foregoing specification signed at Essen, Germany, this 4th day of April, 1921.

MAX BARTHOLDY.